(12) United States Patent
Highnam (10) Patent No.: US 10,733,724 B2
(45) Date of Patent: Aug. 4, 2020

(54) METHOD FOR QUANTIFICATION OF IMAGES

(71) Applicant: VOLPARA HEALTH TECHNOLOGIES LIMITED, Wellington (NZ)

(72) Inventor: Ralph Highnam, Wellington (NZ)

(73) Assignee: VOLPARA HEALTH TECHNOLOGIES LIMITED, Wellington (NZ)

( * ) Notice: Subject to any disclaimer, the term of this patent is extended or adjusted under 35 U.S.C. 154(b) by 112 days.

(21) Appl. No.: 15/772,260

(22) PCT Filed: Nov. 7, 2016

(86) PCT No.: PCT/IB2016/056669
§ 371 (c)(1),
(2) Date: Apr. 30, 2018

(87) PCT Pub. No.: WO2017/077511
PCT Pub. Date: May 11, 2017

(65) Prior Publication Data
US 2018/0315186 A1    Nov. 1, 2018

(30) Foreign Application Priority Data
Nov. 5, 2015    (NZ) ........................................ 713915

(51) Int. Cl.
*G06K 9/00* (2006.01)
*G06T 7/00* (2017.01)
*G06T 11/00* (2006.01)

(52) U.S. Cl.
CPC .......... *G06T 7/0012* (2013.01); *G06T 11/003* (2013.01); *G06T 2207/10116* (2013.01); *G06T 2207/30068* (2013.01)

(58) Field of Classification Search
CPC ................. G06T 7/0012; G06T 11/003; G06T 2207/10116; G06T 2207/30068
See application file for complete search history.

(56) References Cited

U.S. PATENT DOCUMENTS 6,246,747 B1 *  6/2001  Wear .................... G01N 23/083
                                                  378/98.11
7,391,892 B2 *  6/2008  Gerwin .................. A61B 6/583
                                                      378/46

(Continued)

FOREIGN PATENT DOCUMENTS

GB         2474319 A      4/2011

OTHER PUBLICATIONS

Wallis, Matthew G., et al. "Two-view and single-view tomosynthesis versus full-field digital mammography: high-resolution X-ray imaging observer study." Radiology 262.3 (2012): 788-796.*

(Continued)

*Primary Examiner* — Shefali D Goradia
(74) *Attorney, Agent, or Firm* — Snell & Wilmer L.L.P.

(57) ABSTRACT

A method comprises receiving image data representative of an X-ray image of at least part of a subject comprising tissue, wherein a first part of the X-ray image is directly 5 exposed and a second part of the X-ray image is representative of tissue in a region of the subject; and determining a measure of attenuation in dependence on an energy measure obtained from the first part of the X-ray image and an energy measure obtained from the second part of the X-ray image.

24 Claims, 7 Drawing Sheets

(56) References Cited

U.S. PATENT DOCUMENTS

| | | | |
|---|---|---|---|
| 2004/0059223 A1* | 3/2004 | Faulkner | A61B 6/482 |
| | | | 600/449 |
| 2004/0062429 A1 | 4/2004 | Kaufhold | |
| 2004/0170561 A1* | 9/2004 | Salb | A61B 6/4035 |
| | | | 424/9.4 |
| 2012/0207271 A1* | 8/2012 | Yang | G01V 5/0016 |
| | | | 378/54 |

OTHER PUBLICATIONS

Van Engeland S et al: "Volumetric Breast Density Estimation From Full-Field Digital Mammograms", IEEE Transactions on Medical Imaging, IEEE Service Center, Piscataway, NJ, US vol. 25, No. 3, Mar. 2006 (Mar. 2006), pp. 273-282 IEEE Transactions on Medical Imaging, IEEE Service Center, Piscataway, NJ, US vol. 25, No. 3, Mar. 2006 (Mar. 2006), pp. 273-282.

Serghei Malkov et al: "Improvements to Single Energy Absorptiometry Method for Digital Mammography to Quantify Breast Tissue Density", Jul. 20, 2008 (Jul. 20, 2008), Digital Mammography; [Lecture Notes in Computer Science], Springer Berlin Heidelberg, Berlin, Heidelberg, pp. 1-8.

International Preliminary Report on Patentability dated May 17, 2018 in PCT Application PCT/IB2016/056669.

\* cited by examiner

METHOD FOR QUANTIFICATION OF IMAGES

CROSS-REFERENCE TO RELATED APPLICATIONS

This application is a U.S. national phase filing under 35 U.S.C. §371 of PCT/IB2016/056669 (the "669 application") filed on Nov. 7, 2016 and entitled "METHOD FOR QUANTIFICATION OF IMAGES." The '669 application claims priority from New Zealand application No. 713915 filed on Nov. 5, 2015 and entitled "METHOD FOR QUANTIFICATION OF IMAGES." All of the applications are incorporated herein by reference in their entirety for all purposes.

FIELD OF INVENTION

The present invention relates to the analysis of an image. A reference value on an image is found from which a feature or region of the image may quantified for further analysis. For example, a breast density may be found. Using the breast density, the breast may be classified as either fatty or dense.

The invention relates in particular to quantification of a feature or region of an image via a comparison of energy imparted to a detector under an object, i.e. the imaged object and comparing it to the energy imparted to a directly exposed region of the image.

BACKGROUND

Imaging systems which automate assessment are known. Medical image processing systems process images to derive certain diagnostic information, for example, from x-ray, magnetic resonance images (MRI) and tomosynthesis. In particular these are used to help in the diagnosis of cancers and measurement of object composition.

Often image processing systems receive a number of images, usually closely related, for example, images of the same subject with slight variation in aspect or timing. Such multiplicity and variety can infer more information than a single image. Further, selective information from multiple images can enhance reliability, for example, exposing a hitherto obstructed object. Thus availability of comparative images can help direct and verify image processing. However, particularly in the field of radiography, images or features of an image are often difficult to interpret due to errors or unknown values in the imaging physics data.

It is known to use mammography to image breast tissue. A mammogram is created by sending x-ray photons towards the breast and detecting how many x-ray photons pass through. The smaller the number of x-ray photons that pass through, the denser the breast tissue. To quantify the image based on an 'absolute' model of the physics along with assumed properties of the breast requires that all the imaging physics data be known and accurate (for example, photon flux, X-ray tube voltage, pixel area and time of exposure). Thus the need to use in-image reference values.

Research undertaken by Highnam and Brady (Highnam and Brady, "Mammographic Image Analysis, Kluwer Academic Publishers 1999) resulted in an understanding of how to automatically compute the density of breast tissue from a mammogram and thereby quantify interesting tissue. Interesting tissue may comprise, for example, fibrous tissue, glandular tissue, water, or cancerous tissue.

The method of Highnam and Brady uses a combination of image processing and x-ray physics and associated imaging physics data which generally relates to conversion of a pixel value P measured at coordinates (x,y), P(x,y), in the mammogram into a thickness of fat, $h_{fat}(x,y)$ cm, and a thickness of 'interesting tissue', $h_{int}(x,y)$ cm, where 'interesting tissue' could be fibrous tissue, glandular tissue, water, or cancerous tissue.

'Interesting tissue' may comprise and/or hide cancers. Thus, irrespective of the imaging technique used, accurate segmentation of the breast in mammograms is essential for effective location and diagnosis of cancers. Segmentation guides the search for abnormalities to the relevant region and enables comparable analysis for example temporal analysis or automated comparison of corresponding images.

PCT/GB2010/001472 provides means to automatically estimate breast composition by calculating $h_{int}$ and $h_{fat}$ values; summing up the $h_{int}$ and $h_{fat}$ values; and computing breast density. The method resolves erroneous indications and error in calculation and calculation bases by always finding a reliable reference spot in an image which then allows calculation of an explicit calibration error. The method is consequently robust to errors and unknown data in the imaging data, and has an associated calibration error factor which can be used to alert the user as necessary.

Further, accurate imaging physics data is unnecessary and in fact the milliampere-second (mAs) and much of the detector information can be ignored, other than assuming that the detector is linear with a known offset.

Such a method works well, but a key step is to define an inner breast edge in which to identify a reference spot—effectively an internal reference point for each image.

In digital breast tomosynthesis (DBT) multiple low-dose x-ray projections of an object are taken and reconstructed to create a pseudo 3D view of the object. The central projection of the DBT is effectively a low dose mammogram and so PCT/GB2010/001472 applies.

Despite its diagnostic advantages, DBT presents challenges for clinical workflow as it involves increased time for reading and interpretation and thereby increased cost and potential for reader oversight, even with the aid of CAD.

SUMMARY OF THE INVENTION

The present invention relates to the analysis of an image. A reference value on an image is found from which a feature or region of the image may quantified for further analysis.

The invention relates in particular to quantification of a feature or region of an image via a comparison of energy imparted to a detector under an object, i.e. the imaged object, and comparing it to the energy imparted to a directly exposed region of the image.

The present invention relates to an improved method for the automatic analysis of one or more quantitative measures of an image feature wherein, for example, an imaging system is used to capture an image and image properties are quantified using image processing techniques.

Advantageously, in respect to mammography, the method entails the use of low dose images in the early assessment of a woman's breast composition and computation of her baseline risk at a young age. This improves the outcome for the patient and helps in turn to optimise clinical workflow.

It is an advantage of the present invention that it establishes early on whether a breast is fatty or dense, and in low-dose images. It resolves breast composition estimation from images such as DBT by utilizing the low dose nature of the image to correctly set the inner breast region for searching. In particular, the invention relates to quantification of an image via the comparison of the energy imparted to the detector under an object such as a breast and energy imparted to the directly exposed region of an image.

Importantly, the success of the technique in low dose images suggests that low dose x-ray assessment of a breast can be used in early assessment of a woman's breast composition, a baseline risk computed at an early age whereby features such as, density, a known precursor to cancer, can be tracked over time and a cancer detected early.

A significant step is to define an inner breast edge in which to identify a reference spot—effectively an internal reference point for each image. Thus it should be established early in the process if a breast is fatty, or dense.

In a first aspect of the invention, there is provided a method comprising: receiving image data representative of an X-ray image of at least part of a subject comprising tissue, wherein a first part of the X-ray image is directly exposed and a second part of the X-ray image is representative of tissue in a region of the subject; and determining a measure of attenuation in dependence on an energy measure obtained from the first part of the X-ray image and an energy measure obtained from the second part of the X-ray image.

The X-ray image may comprise both directly exposed regions, for example for which the X-rays do not pass through the subject or tissue, and regions representative of said at least part of the subject.

The energy measure obtained from the first part of the X-ray image may be representative of input X-ray energy. The energy measure obtained from the second part of the X-ray image may be representative of X-ray energy attenuated by tissue.

The method may further comprise using the measure of attenuation to estimate a tissue density within at least part of the region of the subject.

The estimated tissue density may provide an approximate value for tissue density at an early stage of an image analysis process.

Determining the measure of attenuation may comprise dividing the energy measure obtained from the first part of the X-ray image and the energy measure obtained from the second part of the X-ray image to obtain an attenuation value; and dividing the attenuation value by a thickness of tissue in the region of the subject to obtain the measure of attenuation.

The method may further comprise obtaining the energy measure from the first part of the X-ray image using at least one pixel value of at least one pixel in the first part of the X-ray image; and obtaining the energy measure of the second part of the X-ray image using at least one pixel value of at least one pixel in the second part of the X-ray image.

The method may further comprise determining a reference point on the X-ray image, wherein the determining of the reference point is performed in dependence on the estimated tissue density. The method may comprise determining a plurality of reference points on the X-ray image.

The selecting of the reference point may comprise selecting between a first procedure and second procedure for the determining of the reference point, the selecting between the first procedure and second procedure being based on the estimated tissue density.

By using the estimated tissue density, different types of tissue may be classified early in an image analysis process, allowing different procedures for determining a reference point to be used. This may result in savings in time and/or computational power.

The reference point may comprise a point in the region of the subject at which the tissue substantially or mostly comprises fat. The reference point may be used to calibrate pixel values of the X-ray image.

Each of the first procedure and second procedure may comprise determining a tissue boundary on the X-ray image, the tissue boundary dividing a first tissue region from a second tissue region, and selecting the reference point in dependence on the tissue boundary.

The second procedure may further comprise iterating the position of the tissue boundary until a criterion of the tissue boundary is met. Iterating the position of the tissue boundary may change an extent of the first tissue region and of the second tissue region.

The method may further comprise using the reference point to determine, for each of a plurality of points in the region of the subject, a thickness of fat $h_{fat}$ and a thickness of interesting tissue $h_{int}$.

The method may further comprise determining a density of tissue in the region of the subject. The determining of the density of tissue may be based on $h_{fat}$ and $h_{int}$ for the plurality of points.

Selecting between the first procedure and the second procedure may comprise selecting the first procedure if the estimated tissue density is higher than a threshold tissue density and selecting the second procedure if the estimated tissue density is lower than a threshold tissue density. The first procedure may be selected for dense breasts. The second procedure may be selected for fatty breasts. Early selection between a first procedure for dense breasts and a second procedure for fatty breasts may result in savings in time and/or computational power.

The region of the subject may comprise at least part of a breast. The estimated tissue density may be an estimated tissue density of the at least part of the breast.

The selecting of the reference point in the first procedure may comprise selecting a reference point near to an edge of the breast. The selecting of the reference point in the second procedure may comprise selecting a reference point further from the edge of the breast.

The selecting of the reference point in the first procedure may comprise selecting the reference point in the first tissue region or on the tissue boundary. The selecting of the reference point in the second procedure may comprise selecting the reference point on the iterated tissue boundary or in the second tissue region.

The tissue boundary may comprise an inner breast edge. The first tissue region may be between the inner breast edge and a or the edge of the breast. The second tissue region may be inside the inner breast edge. The iterating of the inner breast edge may comprise moving the inner breast edge inwards, away from the edge of the breast.

The region of the subject may comprise at least part of the chest and/or at least part of the lung.

The method may further comprise obtaining the image data by performing an X-ray imaging procedure.

The X-ray imaging procedure may comprise a mammography procedure. The X-ray imaging procedure may comprise a digital breast tomosynthesis (DBT) procedure.

In DBT, each projection uses a low radiation dose, so the detector does not saturate. Risk to younger subjects may be minimised as density may be estimated at lower dose.

The X-ray imaging procedure may comprise selecting an input X-ray energy that is below a saturation threshold of an X-ray detector using in the X-ray imaging procedure, such that pixel values in the first part of the X-ray image vary with input X-ray energy.

The input X-ray imaging energy may be less than 1 mGy. The input X-ray imaging energy may be less than 0.5 mGy. The input X-ray imaging energy may be less than 0.3 mGy.

The X-ray image may be acquired using monoenergetic X-rays.

The X-ray image may be acquired using polyenergetic X-rays.

The method may further comprise determining the first part and second part of the X-ray image by segmenting the image data.

In a second aspect of the invention, which may be provided independently, there is provided a method comprising: receiving an X-ray image of a breast; from a directly exposed part of the X-ray image, obtaining an indication of energy entering the breast; from an area of the X-ray image that is representative of the breast, obtaining an indication of energy out of the breast; dividing the indication of energy in by the indication of energy out to obtain an X-ray attenuation; dividing the X-ray attenuation by a thickness of the breast to obtain an average effective attenuation per volumetric segment; and using the average effective attenuation per volumetric segment to estimate a breast density of the breast.

In a third aspect of the invention, which may be provided independently, there is provided an apparatus comprising a processor configured to: receive image data representative of an X-ray image of at least part of a subject comprising tissue, wherein a first part of the X-ray image is directly exposed and a second part of the X-ray image is representative of tissue in a region of the subject; and determine a measure of attenuation in dependence on an energy measure obtained from the first part of the X-ray image and an energy measure obtained from the second part of the X-ray image.

There may be provided a computer program product comprising computer readable instructions that are executable by a processor to perform a method as claimed or described herein.

In a fourth aspect of the invention, which may be provided independently, there is provided a method for quantifying an image whereby a reference value on an image is found; breast density is estimated using the directly exposed part of the image to obtain an indication of energy entering the breast ('energy in'); the pixel value(s) within the region estimated to get an indication of energy leaving the breast ('energy out') where $$\text{X-ray attenuation } uh = \ln(\text{Energy In/Energy Out})$$

and the attenuation is divided by the breast thickness to obtain average effective attenuation per centimetre in the breast.

The reference region may be a fatty region and the search conducted away from the breast edge. The reference region may be dense and the search is conducted near the breast edge. The method may be applied to DBT images. The method may be applied to low dose images. The x-ray assumption may be a monoenergetic x-ray assumption. The x-ray assumption may be a polyenergetic x-ray assumption.

There may be provided a method or apparatus substantially as described herein with reference to the accompanying drawings.

Features in one aspect may be provided as features in any other aspect as appropriate. For example, features of a method may be provided as features of an apparatus and vice versa. Any feature or features in one aspect may be provided in combination with any suitable feature or features in any other aspect.

DETAILED DESCRIPTION

The present invention relates to an improved method for analysis and quantification of images, in particular low dose images i.e. where the pixel value in the detector is not saturated and reflects an approximate measure of the input x-ray energy.

A reference value on an image, is found, for example a region of fatty tissue, by searching within an appropriate region of the image. In a preferred embodiment this region is away from the breast edge. Knowing that the breast is fatty, and searching away from the vicinity of the breast edge avoids noisy, corrupt points.

Alternatively, if the breast is dense, the search is conducted close to the breast edge.

It is an advantage of the present invention that means are provided to ascertain whether a breast is fatty or dense before computing breast composition and an 'guided' estimation of breast composition is attained, by using the energy imparted to the detector under the breast, and the energy imparted to the detector outside the breast.

By way of illustrative embodiment only the present invention is described in relation to DBT images.

Figure 1:
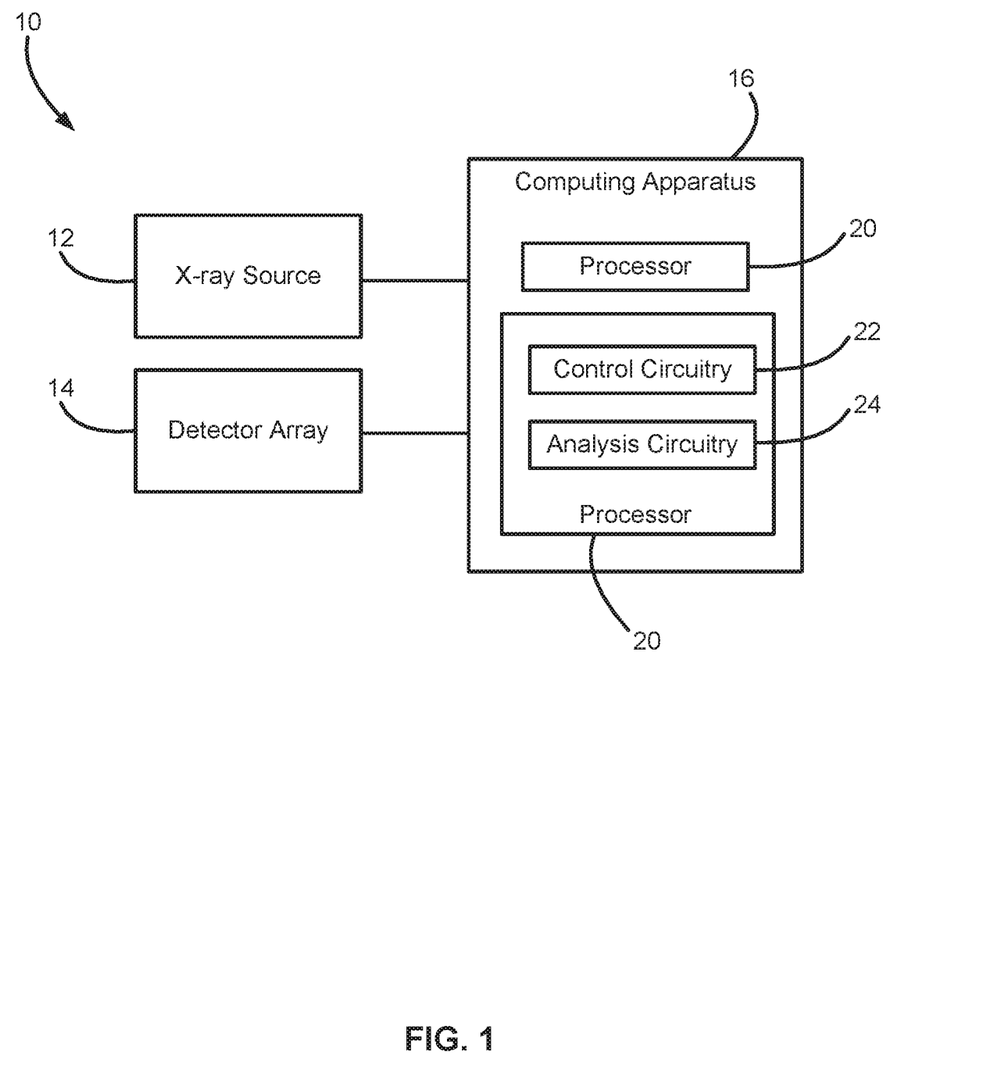
FIG. 1 is a schematic illustration of an X-ray imaging apparatus.

FIG. 1 is a schematic illustration of an X-ray imaging apparatus 10 in accordance with an embodiment. In the present embodiment, X-ray imaging apparatus 10 is a digital breast tomosynthesis (DBT) imaging apparatus. In other embodiments, any X-ray imaging apparatus may be used.

X-ray imaging apparatus 10 comprises an X-ray source 12 and a detector array 14 comprising a plurality of detector elements. X-ray source 12 and detector array 14 are each connected to a computing apparatus 16. Computing apparatus 16 comprises a processor 20 and a data store 18 configured to store image data obtained by detector array 14. Processor 20 comprises control circuitry 22 configured to control parameters of an X-ray imaging procedure, and image analysis circuitry 24 configured to analyse X-ray images obtained by the detector array. In other embodiments, any suitable computing apparatus or apparatuses may be used.

Figure 2:
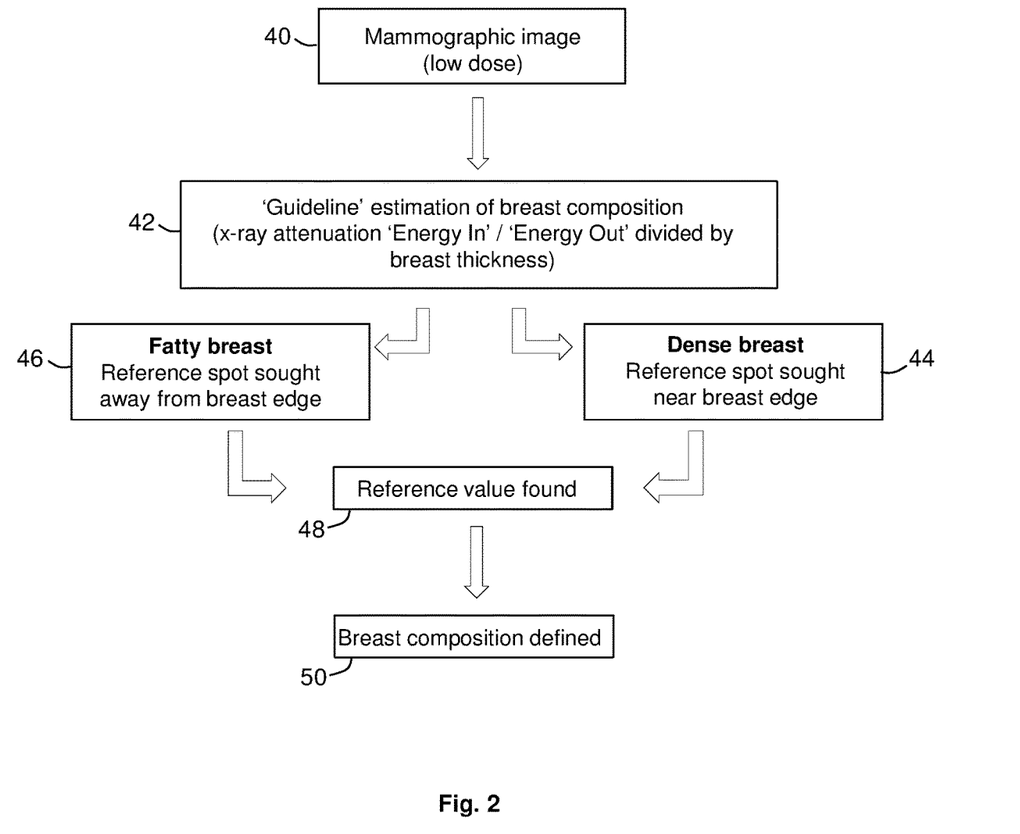
FIG. 2 is a flow chart illustrating in overview a method of an embodiment.

FIG. 2 is a flow chart illustrating in overview a method of an embodiment. At stage 40 of the method of FIG. 2, the X-ray apparatus 10 is used to obtain a low dose mammographic image (which in this embodiment is a DBT image) of a patient's breast. The breast is placed between the X-ray source 12 and X-ray detector array 14. The computing apparatus 16 causes the X-ray source 12 to emit low dose, monoenergetic X-ray radiation. An input energy used is between 0 mGy and 0.5 mGy, for example between 0.05 mGy or 0.1 mGy and 0.5 mGy. (For comparison, a range of input energy for standard mammograms that are not low dose may be from 0.7 mGy to 2.4 mGy.) In other embodiments, polyenergetic X-ray radiation may be used.

Radiation from the X-ray source 12 is received by the X-ray detector 14. The image processing circuitry 22 receives signals from the X-ray detector representative of an amount of X-ray radiation received by each detector array element. The image processing circuitry 22 processes the signals to obtain a set of image data representative of an X-ray image comprising a plurality of pixels. Each pixel may be representative of radiation received by a respective detector array element.

Figure 3:
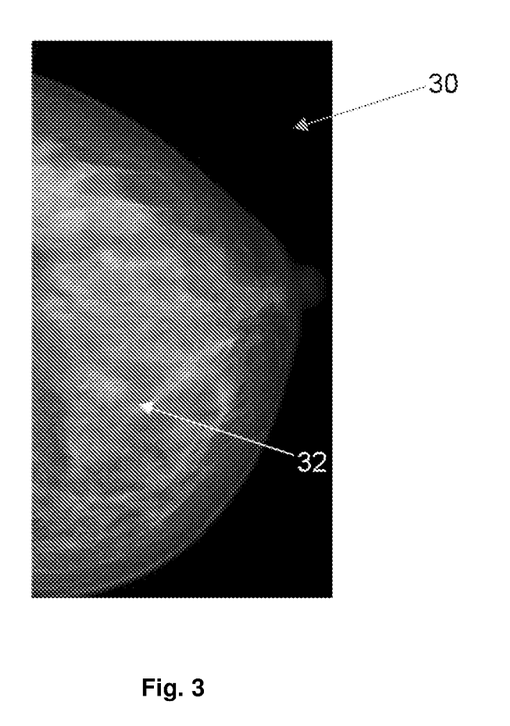
FIG. 3 shows direction of energy imparted into breast and energy imparted out of the breast.

FIG. 3 is an example of a mammographic image obtained using X-ray imaging apparatus 10. A first part 30 of the image is directly exposed by X-ray radiation from the X-ray source 12. In the first part 30, radiation received by the X-ray detector 14 has not passed through tissue. The first part 30 appears dark in FIG. 2. However, the input energy of the X-ray radiation is such that the detector elements are not saturated. A signal provided by each detector element is representative of the X-ray radiation received by that detector element, even in the directly exposed part of the image.

A second part 32 of the image is exposed by X-ray radiation that has passed through tissue of the breast.

At stage 42 of FIG. 2, the processor 20 processes the image data to obtain a guideline estimate of breast composition. The processor 20 obtains an energy value for each pixel of the image data using the pixel value of that pixel.

In the present embodiment, pixel values are converted to energy by assuming linear:

Energy Imparted($x,y$)=$a$×pixel value($x,y$)+$b$ (Equation 1)

where a and b are commonly known.

The processor 20 divides the image into a first part that is directly exposed and a second part that is representative of tissue. The processor 20 may segment the breast in the image, for example by using a threshold pixel value to distinguish between pixels of breast tissue and directly exposed pixels. Breast density is estimated using the directly exposed part of the image to obtain an indication of 'energy in' (that is, energy entering the breast) and the pixel values within the indicated breast area to get an indication of 'energy out' (that is, energy out of the breast), along with a monoenergetic x-ray assumption:

X-ray attenuation $uh$=ln(Energy In/Energy Out) (Equation 2)

where uh is the symbol for X-ray attenuation, Energy In is energy entering the breast, and Energy Out is energy out of the breast.

In the present embodiment, the processor 20 determines an average energy of the pixels in the first part of the image (which is directly exposed). The processor 20 determines an average energy of the pixels in the second part of the image (in which the radiation passes through the breast). The processor 20 then divides the average energy of the pixels in the first, directly exposed part by the average energy of the pixels in the second part to obtain an attenuation value.

In other embodiments, the processor 20 may determine values for any energy measure in the first part and in the second part. For example, the processor 20 may determine any statistical combination of energy values for pixels in the first part and in the second part.

In some embodiments, the processor 20 determines the attenuation value by taking a logarithm of an energy measure of the first part divided by an energy measure of the second part. However with DBA (digital breast attenuation), the attenuation value is computed without taking the log (because it is monotonic).

This attenuation is then divided by the breast thickness to obtain average effective attenuation per volumetric segment e.g. centimetre in the breast.

In the present embodiment, the breast thickness is a measured thickness obtained by the X-ray imaging apparatus 10. In other embodiments, a thickness may be obtained by any suitable method. The attenuation may be divided by the thickness to obtain any suitable measure of attenuation, for example any measure of attenuation per unit distance.

In the present embodiment, the X-ray radiation is monoenergetic and Equation 1 is used to obtain an attenuation value. More complex models of x-rays can be used such as polyenergetic.

In some embodiments, polyenergetic x-rays are used. Instead of a single equation such as Equation 2, the processor 20 performs an integral across many energies.

The processor 20 uses the average effective attenuation per centimetre to determine a guideline estimation of breast composition. Breast density is estimated by estimating breast composition. A breast having a lower proportion of fat is more dense than a breast having a higher proportion of fat, and so has a greater average effective attenuation per centimetre.

A breast having a high proportion of fat (and therefore a low density) may be referred to as a fatty breast. A breast having a lower proportion of fat (and therefore a high density) may be referred to as a dense breast. The average effective attenuation per centimetre is low for fatty breasts, and high for dense breasts.

Examples of attenuation calculations for fatty and dense breasts are now provided.

Figure 4:
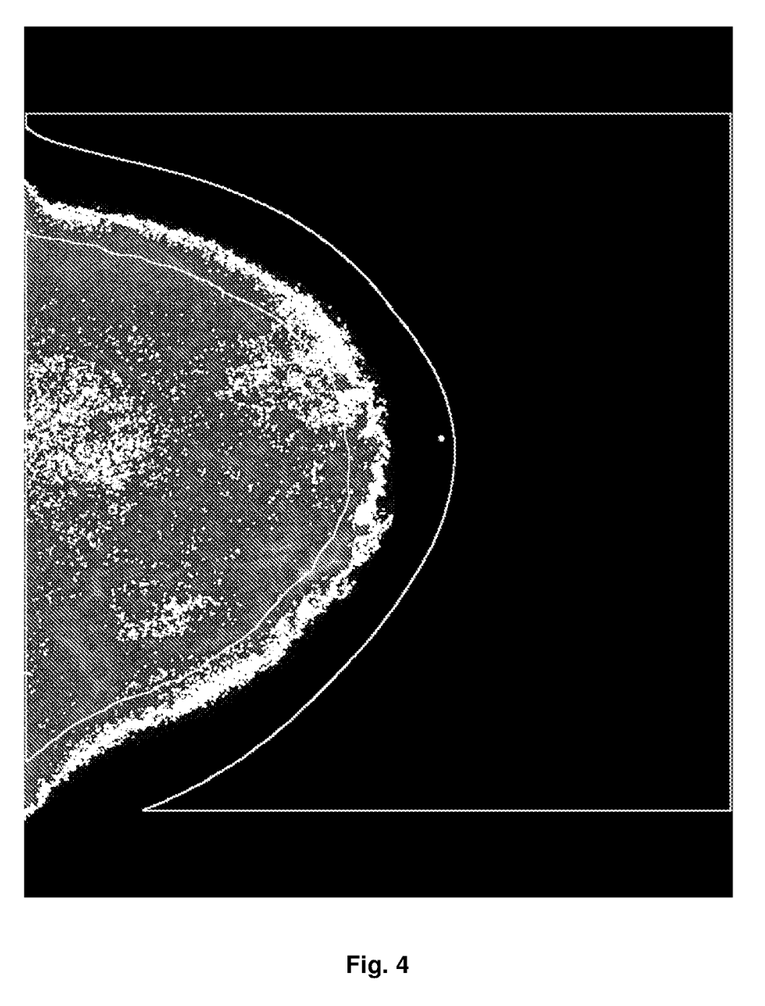
FIG. 4 is an image including reference points for a fatty breast.
Figure 5:
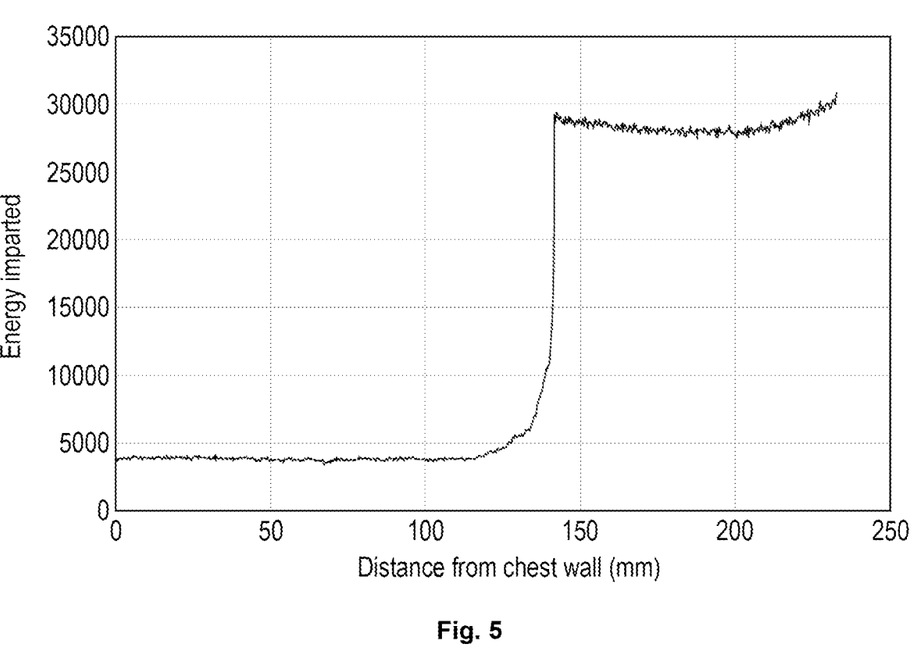
FIG. 5 is an energy profile of a fatty breast.

An image of a fatty breast is shown in FIG. 4. The white spots in FIG. 4 are the reference points of fat. The thin white line over the breast tissue in a rough semi-circular shape is the inner breast edge. An energy profile of a fatty breast, showing energy imparted versus distance from the chest wall, is shown in FIG. 5.

An attenuation calculation for the breast of FIG. 4 is shown below:

Average energy in the inner breast is 4175.38
Average energy on the detector is 37424.60
Breast thickness is 65 mm

DBA=(37424.60/4175.38)/65=0.138 where DBA stands for digital breast attenuation.

Figure 6:
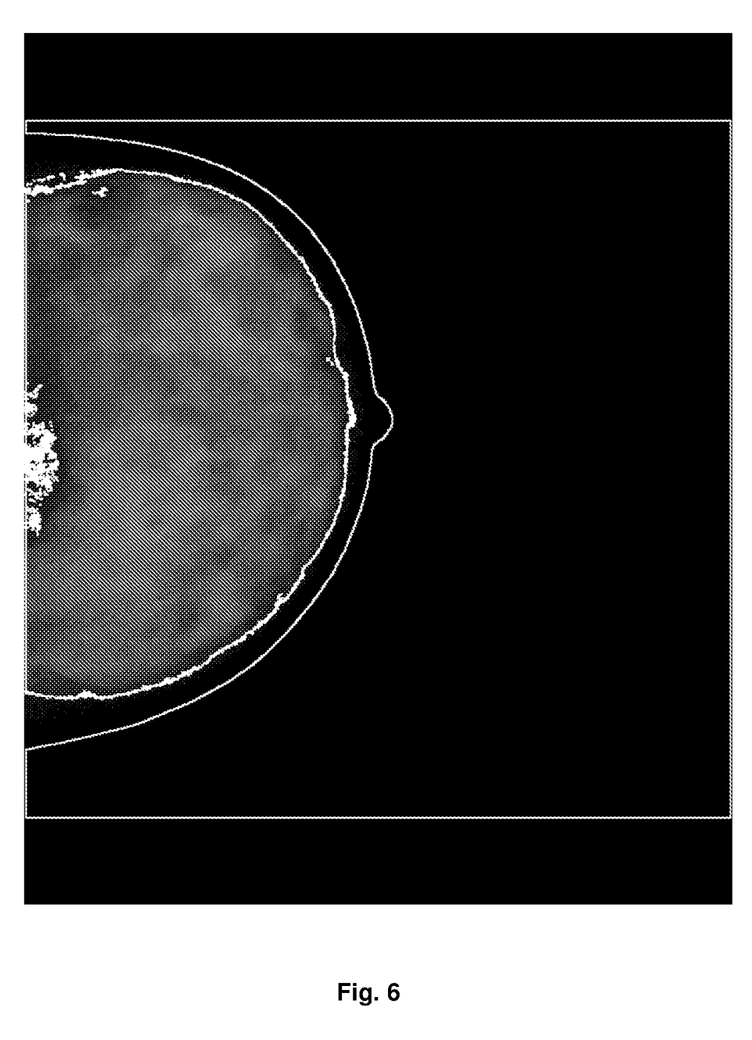
FIG. 6 is an image including reference points for a dense breast.
Figure 7:
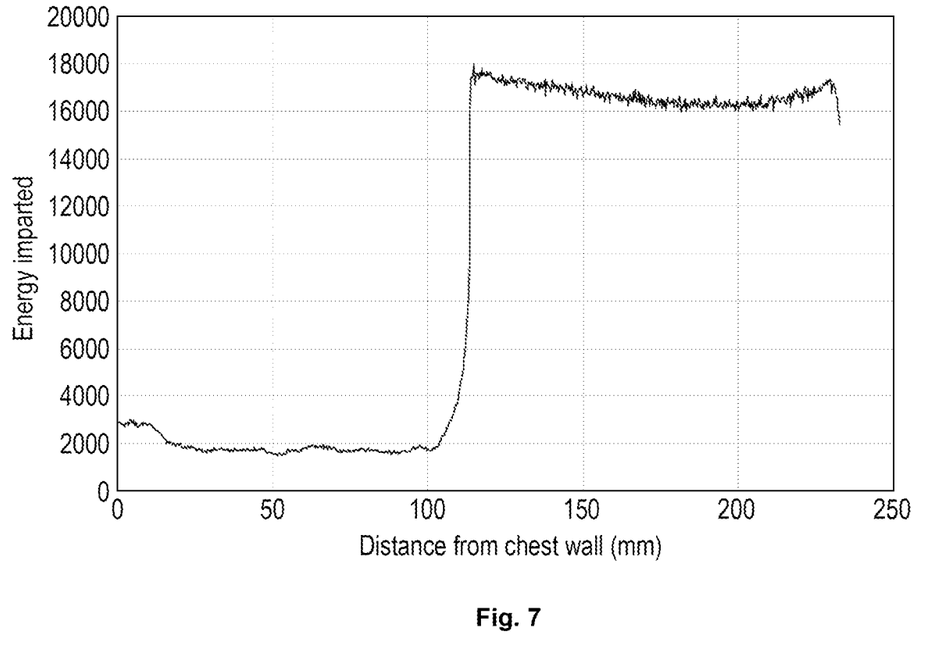
FIG. 7 is an energy profile of a dense breast.

An image of a dense breast is shown in FIG. 6. White spots are reference points of fat, and the thin white line over the breast tissue in a rough semi-circular shape is the inner breast edge. An energy profile of a dense breast, showing energy imparted versus distance from the chest wall, is shown in FIG. 7.

An attenuation calculation for the breast of FIG. 6 is shown below:

Average energy in the inner breast is 1990.48
Average energy on the detector is 22122.41
Breast thickness is 47 mm

DBA=(22122.41/1990.48)/47=0.236

It may be seen that the value for the measure of attenuation, DBA, is lower for the fatty breast than for the dense breast.

The processor 20 determines whether to proceed to stage 44 or stage 46 of the method of FIG. 2 based on the determined average effective attenuation per centimetre that is calculated at stage 42. The average effective attenuation per centimetre is used as a rough measure of breast composition. In the present embodiment, a value of 0.2 for DBA indicates potentially a very dense breast. In other embodiments, different values may be used. If the breast is determined to be a dense breast, the method proceeds to stage 44. If the breast is determined to be a fatty breast, the method proceeds to stage 44.

In the present embodiment, if the average effective attenuation per centimetre is above a threshold value, the method proceeds to stage 44. If the average effective attenuation per centimetre is below the threshold value, the method proceeds to stage 46.

Stage 44 and stage 46 each provide a method of determining a reference point (which may also be referred to as a reference spot) within the breast. The reference point may be a point at which the tissue of the breast is substantially or mostly fat.

At stage 44, the processor 20 performs a first procedure.

The processor 20 generates a histogram of the frequency of occurrence of pixel values for pixels in the X-ray image. The processor 20 detects a gap which lies between two peaks of the histogram using a single image statistic generated from the pixel values such that the gap location provides a threshold pixel value demarking a first estimate of an inner breast edge.

The inner breast edge is a line in the X-ray image that divides a first tissue region that is between the inner breast edge and an edge of the breast from a second tissue region that is inside the inner breast edge. In a dense breast, the first tissue region may be described as a fatty breast edge. The second tissue region may be described as dense breast tissue.

The inner breast edge may be determined such that the first tissue region comprises pixels having a pixel value below the threshold pixel value and the second tissue region comprises pixels having a pixel value above the threshold pixel value.

In other embodiments, any suitable method of determining the inner breast edge may be used. The inner breast edge may be determined using phase congruency. The inner breast edge may be determined using a threshold pixel value established from tissue image statistics. The determining of the inner breast edge may comprise image processing, for example segmentation. The determining of the inner breast edge may comprise using a semi-circular assumption for the breast edge.

Once the inner breast edge has been determined, the processor 20 selects a reference point on the inner breast edge. In other embodiments, the processor 20 selects a reference point in the first tissue region (the fatty breast edge). In general, for a dense breast the reference point is selected near to the edge of the breast. The processor 20 may select a plurality of reference points.

In the present embodiment, the processor 20 seeks an area of the outer breast which appears all fatty, models the breast edge and predicts what the fat reference point would be like internally. In other embodiments, the processor 20 may look for an entirely dense point rather than an entirely fat point.

In some embodiments, the inner breast edge is determined, and a reference point found, using a method as described, for example, at any of page 12 line 26 to page 13 line 2, page 13 lines 11 to 18, page 19 lines 4 to 11, and page 21 lines 4 to 17 of PCT/GB2010/001472, which is hereby incorporated by reference.

If the breast is determined to be fatty, the processor 20 performs stage 46 instead of stage 44. At stage 46, the processor 20 performs a second procedure. The second procedure comprises generating a histogram, detecting a gap in the histogram, and determining an inner breast edge as described above with reference to stage 44. However, in the case of a fatty breast, the first region comprises a fatty breast edge and the second region comprises fatty breast tissue. Therefore, determining a reference point using the inner breast edge as initially determined may not provide the best reference point.

The second procedure further comprises moving the inner breast edge inwards (i.e. away from the edge of the breast) in an iterative manner by increasing the threshold pixel value until a preselected characteristic of the inner breast edge is found. In the present embodiment, the inner breast edge is moved inwards in an iterative manner until an intensity edge is found along sufficient of the length of the inner breast edge.

In other embodiments, the processor 20 moves the inner breast edge inwards until any suitable criterion is met. For example, the inner breast edge may be moved based on a breast area and/or an area of a breast edge. The inner breast edge may be moved until a desired intensity criterion or smoothness criterion is met. The inner breast edge may be moved until an intensity edge is found along at least part of the inner breast edge and/or until a smooth homogeneous edge is found.

The processor 20 delimits a region in which to search for a reference point to pixels inwards of or on the found inner breast edge (after the inner breast edge has been moved). The processor 20 selects a reference point inwards of or on the inner breast edge. In general, for a fatty breast the reference point is selected further from the edge of the breast than in the case of a dense breast. The processor 20 may select a plurality of reference points.

In some embodiments, the inner breast edge is determined, and a reference point found, using a method as described, for example, at page 13 line 24 to 29 and page 19 line 21 to 31 of PCT/GB2010/001472, which is hereby incorporated by reference.

Having selected a reference point using either the first procedure of stage 44 or the second procedure of stage 46, the method of FIG. 2 proceed to stage 48.

At stage 48, the processor 20 uses the pixel value and/or energy value of the reference point to obtain a reference value. The processor 20 may use the reference value to calibrate energy values of other pixels in the X-ray image. In some embodiments, the processor 20 uses a plurality of reference points to obtain the reference value.

At stage 50, the processor 20 uses the calibrated energy values of the X-ray image to determine for each of a plurality of points in the X-ray image (for example, for each pixel) a thickness of fat $h_{fat}$ and a thickness of interesting tissue $h_{int}$, where interesting tissue may comprise at least one of fibrous tissue, glandular tissue, water, or cancerous tissue. Since it is known that the reference value is representative of a point that is all or mostly fat, the composition at other points can be determined based on the reference value.

In the present embodiment, the processor 20 establishes an $h_{int}$ representation of interesting tissue corresponding to each pixel of the breast tissue image by comparing each pixel value in the breast tissue image to pixel values at the reference point so as to obtain a relative difference for each pixel. The processor 20 uses the $h_{int}$ representation in analysis of the tissue to predict a volume of fibroglandular tissue corresponding to each pixel in the breast tissue image and summing the values to quantify the breast tissue.

The processor 20 performs an automatic estimation of breast composition by calculating for each pixel a corresponding thickness of fat $h_{fat}$, summing up the $h_{int}$ and $h_{fat}$ values, and subsequently computing breast density. The computing of breast density may comprise using a volume of fat and volume of interesting tissue as described at page 16 lines 21 to 24 of PCT/GB2010/001472. In other embodiments, any suitable method of determining breast density using the reference value may be used.

The breast composition determined at stage 50 may be more accurate than the estimated breast composition of stage 42.

By determining early on in the process whether the breast is dense or fatty, the inner breast edge may be set accurately and an improved breast composition estimate may be obtained. The method of determining breast composition may be improved by having early knowledge of whether the breast is dense or fatty, and choosing a different calculation procedure for a dense breast than for a fatty breast.

Thus, using the average effective attenuation as a rough measure of breast composition, the present invention indicates where the inner breast edge should be found to obtain a good reference point of fat and the method described in PCT/GB2010/001472 then applies. Different procedures for finding the reference point are used depending on whether the breast is fatty or dense.

The early determination of whether a breast is fatty or dense may result in savings in time and/or savings in computational power.

The pixel value in the directly exposed area is often saturated on film-screen and digital mammograms, so the computed x-ray attenuation comes out too low for most standard breast x-rays.

In DBT each projection uses low radiation dose, so the detector does not saturate and the value becomes usable to estimate density. It is thus a further advantage of the present invention that the risk to younger subjects from radiation is minimised as it enables estimation of density at lower dose, identifies the region of interest for further analysis and thereby enables baseline scans and density and risk assessment at an early age.

The method described above with reference to FIG. 2 is performed on an X-ray image of the breast. The method may be performed on an X-ray image of any suitable subject, for example any human or animal subject. The region of the subject may comprise at least part of the chest and/or at least part of the lung.

Instead of an inner breast edge, any suitable tissue boundary may be determined. The method may be used to select between any two or more procedures.

The invention has been described by way of several embodiments, with modifications and alternatives, but having read and understood this description further embodiments and modifications will be apparent to those skilled in the art. All such embodiments and modifications are intended to fall within the scope of the present invention.

The invention claimed is:

1. A method comprising:
    receiving image data representative of an X-ray image of at least part of a subject comprising tissue, wherein a first part of the X-ray image is directly exposed and a second part of the X-ray image is representative of tissue in a region of the subject;
    determining a measure of attenuation in dependence on an energy measure obtained from the first part of the X-ray image and an energy measure obtained from the second part of the X-ray image;
    using the measure of attenuation to estimate a tissue density within at least part of the region of the subject to obtain an estimated tissue density; and
    determining a reference point on the X-ray image, wherein the determining of the reference point is performed in dependence on the estimated tissue density, and wherein the determining of the reference point comprises selecting between a first procedure and second procedure for the determining of the reference point, the selecting between the first procedure and second procedure being based on the estimated tissue density.

2. The method according to claim 1, wherein determining the measure of attenuation comprises dividing the energy measure obtained from the first part of the X-ray image and the energy measure obtained from the second part of the X-ray image to obtain an attenuation value; and dividing the attenuation value by a thickness of tissue in the region of the subject to obtain the measure of attenuation.

3. The method according to claim 1, further comprising obtaining the energy measure from the first part of the X-ray image using at least one pixel value of at least one pixel in the first part of the X-ray image; and obtaining the energy measure of the second part of the X-ray image using at least one pixel value of at least one pixel in the second part of the X-ray image.

4. The method according to claim 1, wherein each of the first procedure and second procedure comprises determining a tissue boundary on the X-ray image, the tissue boundary dividing a first tissue region from a second tissue region, and selecting the reference point in dependence on the tissue boundary.

5. The method according to claim 4, wherein the second procedure further comprises iterating the position of the tissue boundary until a criterion of the tissue boundary is met.

6. The method according to claim 4, wherein the selecting of the reference point in the first procedure comprises selecting the reference point in the first tissue region or on the tissue boundary; and the selecting of the reference point in the second procedure comprises selecting the reference point on the iterated tissue boundary or in the second tissue region.

7. The method according to claim 4, wherein the tissue boundary comprises an inner breast edge; the first tissue region is between the inner breast edge and a or the edge of the breast; and the second tissue region is inside the inner breast edge.

8. The method according to claim 1, further comprising using the reference point to determine, for each of a plurality of points in the region of the subject, a thickness of fat hfat and a thickness of interesting tissue hint.

9. The method according to claim 8, further comprising determining a density of tissue in the region of the subject, wherein the determining of the density of tissue is based on hfat and h.sub.int for the plurality of points.

10. The method according to claim 1, wherein selecting between the first procedure and the second procedure comprises selecting the first procedure if the estimated tissue density is higher than a threshold tissue density and selecting the second procedure if the estimated tissue density is lower than a threshold tissue density.

11. The method according to claim 1, wherein the region of the subject comprises at least part of a breast.

12. The method according to claim 1, wherein the estimated tissue density is an estimated tissue density of the at least part of the breast.

13. The method according to claim 1, wherein the selecting of the reference point in the first procedure comprises selecting a reference point near to an edge of a breast;

and the selecting of the reference point in the second procedure comprises selecting a reference point further from the edge of the breast.

14. The method according to claim 1, wherein the region of the subject comprises at least part of the chest and/or at least part of the lung.

15. The method according to claim 1, further comprising obtaining the image data by performing an X-ray imaging procedure.

16. The method according to claim 15 wherein the X-ray imaging procedure comprises a mammography procedure.

17. The method according to claim 15, wherein the X-ray imaging procedure comprises a digital breast tomosynthesis procedure.

18. The method according to claim 15, wherein the X-ray imaging procedure comprises selecting an input X-ray energy that is below a saturation threshold of an X-ray detector using in the X-ray imaging procedure, such that pixel values in the first part of the X-ray image vary in dependence on input X-ray energy.

19. The method according to claim 15, wherein the input X-ray imaging energy is less than 0.5 mGy.

20. The method according to claim 1, wherein the X-ray image is acquired using monoenergetic X-rays.

21. The method according to claim 1, wherein the X-ray image is acquired using polyenergetic X-rays.

22. The method according to claim 1, further comprising determining the first part and second part of the X-ray image by segmenting the image data.

23. An apparatus comprising a processor configured to:
receive image data representative of an X-ray image of at least part of a subject comprising tissue, wherein a first part of the X-ray image is directly exposed and a second part of the X-ray image is representative of tissue in a region of the subject;
determine a measure of attenuation in dependence on an energy measure obtained from the first part of the X-ray image and an energy measure obtained from the second part of the X-ray image;
use the measure of attenuation to estimate a tissue density within at least part of the region of the subject to obtain an estimated tissue density; and
determine a reference point on the X-ray image, wherein the determining of the reference point is performed in dependence on the estimated tissue density, and wherein the determining of the reference point comprises selecting between a first procedure and second procedure for the determining of the reference point, the selecting between the first procedure and second procedure being based on the estimated tissue density.

24. A method comprising:
quantifying an image by finding a reference value on the image;
estimating breast density using the directly exposed part of the image to obtain energy in, wherein energy in is an indication of energy entering the breast;
estimating the one or more pixel values within the region to obtain energy out, wherein the energy out is an indication of energy leaving the breast
obtaining X-ray attenuation (uh) by dividing energy in by energy out;
dividing the attenuation by the breast thickness to obtain average effective attenuation per centimetre in the breast
using the average effective attenuation to estimate a tissue density within at least part of the region of the subject to obtain an estimated tissue density; and
determining a reference point on the X-ray image, wherein the determining of the reference point is performed in dependence on the estimated tissue density, and wherein the determining of the reference point comprises selecting between a first procedure and second procedure for the determining of the reference point, the selecting between the first procedure and second procedure being based on the estimated tissue density.

* * * * *